C. P. WOODALL.
EGG TESTER.
APPLICATION FILED DEC. 13, 1916.

1,235,869.

Patented Aug. 7, 1917.
2 SHEETS—SHEET 1.

Witnesses

C. P. Woodall  Inventor by  Attorneys

C. P. WOODALL.
EGG TESTER.
APPLICATION FILED DEC. 13, 1916.
1,235,869.
Patented Aug. 7, 1917.
2 SHEETS—SHEET 2.
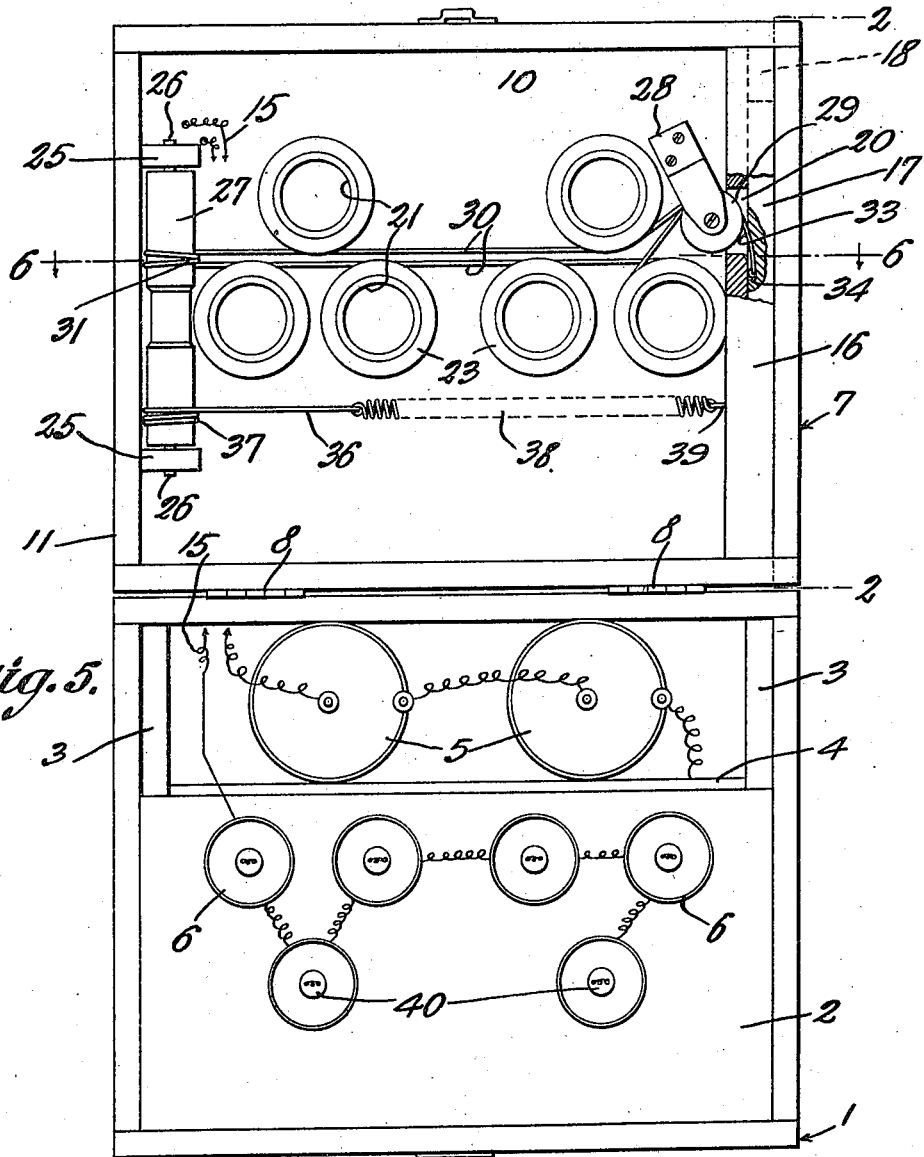
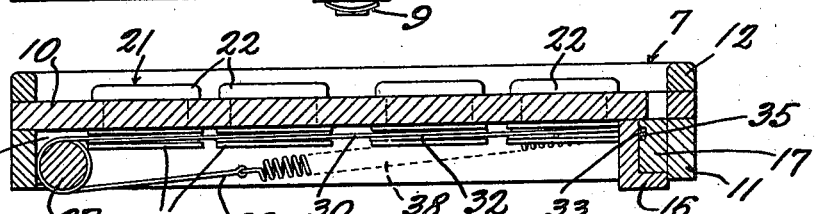
Witnesses
C. P. Woodall, Inventor
by
Attorneys

UNITED STATES PATENT OFFICE.

CHARLES P. WOODALL, OF LAKEWOOD, ILLINOIS.

EGG-TESTER.

1,235,869.  Specification of Letters Patent.  Patented Aug. 7, 1917.

Application filed December 13, 1916. Serial No. 136,740.

*To all whom it may concern:*

Be it known that I, CHARLES P. WOODALL, a citizen of the United States, residing at Lakewood, in the county of Shelby and State of Illinois, have invented a new and useful Egg-Tester, of which the following is a specification.

The device forming the subject matter of this application is an egg tester, and the invention aims to provide novel means whereby the egg holders may have a rotary movement imparted thereto, thereby to change the positions of the eggs with respect to the lamps which illuminate the eggs, permitting a better inspection of the eggs than would be possible otherwise.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Fig. 5 is a top plan of the egg tester, the lid being swung backwardly into an open position; and Fig. 6 is a section taken approximately on the line 6—6 of Fig. 5.

Figure 1:
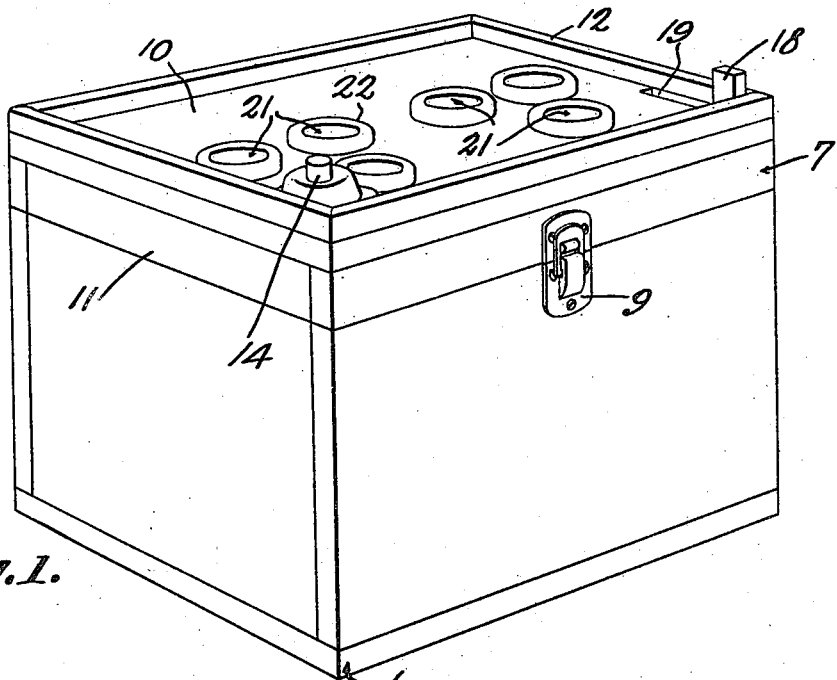
Figure 1 shows in perspective, an egg tester embodying the present invention.

In carrying out the present invention there is provided a supporting structure which includes a box-like body 1 within which is disposed a table 2 supported on cleats 3. A vertical partition 4 is located in the body 1 adjacent the rear edge of the table 2 and defines a compartment in which are located battery cells 5. Reflectors 6 are mounted on the upper surface of the table 2 and within the reflectors 6 are disposed electric lamps 40.

The invention comprises a lid denoted generally by the numeral 7 and united with the body 1 for vertical swinging movement, by means of hinges 8, a latch 9 of any suitable construction being provided, for holding the lid 7 in a closed position on the body 1. The lid 7 includes a platform 10, a depending flange 11 coacting with the upper edge of the body 1, and an upstanding rib 12 which serves to protect the upper ends of egg-carriers which will be described hereinafter. Mounted on the platform 10 of the lid 7, or otherwise located, is a switch 14 which may be a push-button. The numeral 15 indicates an electrical circuit including the switch 14, the battery cells 5 and the lamps 40. The electrical circuit 15 is shown broken away in Fig. 5, in order that important structural features may not be obscured or confused. Any electrician will be fully competent to devise an electrical circuit which will include the lamps 40, the push-button 14 and the battery cells 5. The wires of the circuit 15 are long enough so that the lid 7 may be swung to an open position when desired.

A guide 16 which preferably is L-shaped in cross section, is attached to the under side of the platform 10 of the lid, adjacent one end of the lid, as will be understood readily when Figs. 5 and 6 are examined. Slidable within the contour of the guide 16 and in engagement with the flange 11 at one end of lid 7 is an operating member 17 which may be in the form of a bar, having an upstanding finger piece 18 mounted to move in a slot 19 formed in the platform 10 of the lid. The guide 16 has a lateral opening 20.

Figures 3, 4:
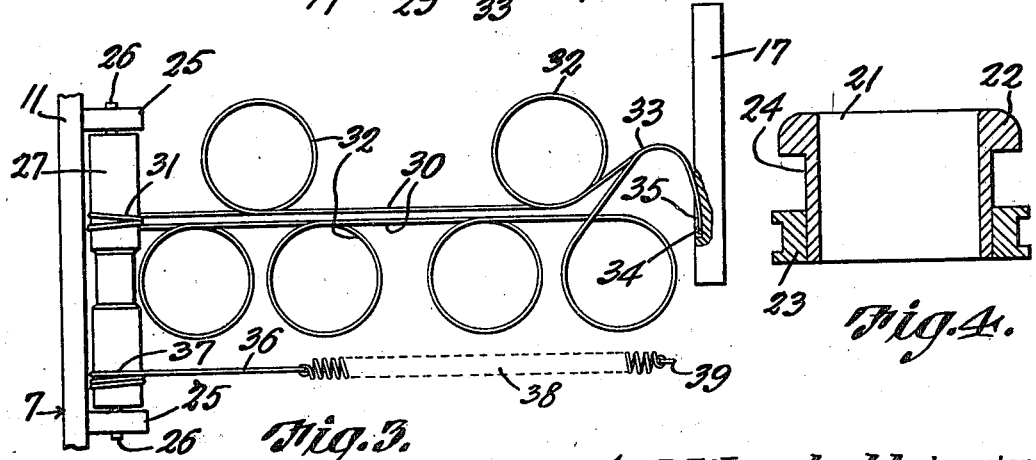
Fig. 3 is a diagrammatic plan view illustrating one form of means whereby rotary movement may be imparted to the egg carriers.
Fig. 4 is a section showing one of the egg holders.

The invention comprises any desired number of tubular egg-holders 21, each equipped at its upper end with a rim 22 constituting an egg-seat. The egg-holders 21 are journaled in openings in the platform 10 of the lid 7 and are prevented from moving downwardly, because the rim 22 engages the upper surface of the platform. Secured to the lower end of each holder 21 is a sleeve 23, coöperating with the rim 22 to form a circumscribing groove 24, as shown in Fig. 4, the groove 24 receiving the platform 10, so that each holder 21 is journaled in the platform, an upward movement of each holder being prevented, since the sleeve 23 coacts with the lower surface of the lid.

Projecting inwardly from the flange 11 of the lid at one end of the lid are bearings 25 in which are rotatable, the end journals 26 of a shaft 27. Attached to the under face of the platform portion 10 of the lid is a bracket 28 in which is journaled a sheave 29 located in or near the opening 21 of the guide 16. The numeral 30 denotes a pair of flexible elements attached at one end, as indicated at 31, to the shaft 27. Intermediate their ends, the flexible elements 30 are formed into loops 32, engaged around the sleeves 23 of the rotatable egg-holders 21. The flexible elements 30 merge into a crotch line 33, trained across the sheave 29 and extended through the opening 20 in the guide 16. The crotch line 33 is secured as shown at 34 to the operating member or slide 17, this element being provided with a recess 35 in which the said end of the crotch line 33 is received, the construction being such that the operating member 17 may substantially fill, transversely, the recess defined by the guide 16 of the adjacent portion of the flange 11, as indicated in Fig. 6. The numeral 36 denotes a flexible element, one end of which is wound about the shaft 27 as shown at 37, and is secured thereto. The other end of the flexible element 36 is attached to one end of a retractile spring 38, the other end of the spring 38 being secured as shown at 39, to any accessible and convenient portion of the lid 7, say the guide 16.

In practical operation, the lid 7 is closed down onto the body 1, as shown in Fig. 1, and is held in place by means of the latch 9. Eggs are placed in the rotatable egg holders 21. The operator manipulates the push-button 14, thus lighting the lamps 40 which are disposed directly below the rotatable carriers 21. In this way, the eggs in the holders 21 will be illuminated, and may be examined.

Figure 2:
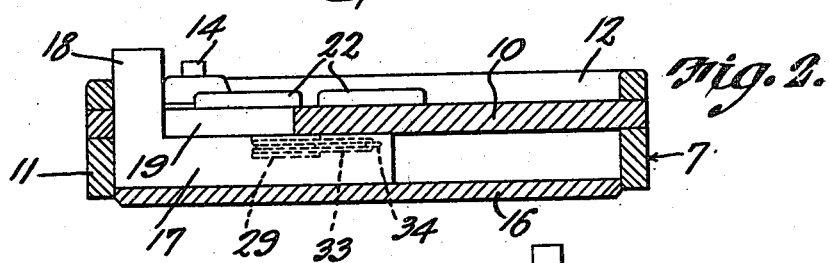
Fig. 2 is a fragmental section of the lid on the line 2—2 of Fig. 5.

Owing to irregularities in the shape of the eggs, owing to irregularities in the thickness of the shell of the eggs, and for other reasons, it is frequently necessary to rotate the eggs, in order that they may be examined adequately by means of the lamps 40, and it is for this purpose that the holders 21 are mounted for rotation. When it is desired to impart a rotating movement to the holders 21, the operating member 17 is slid endwise by means of the finger piece 18. The crotch line 33 imparts a pull on the flexible elements 30, and because the flexible elements 30 are looped as shown at 32 around the sleeves 23 of the holders 21, the holders and the eggs contained therein, will be rotated, above the electric lamps 40. When the flexible elements 30 are put under tension, in the manner hereinbefore described, the shaft 27 will be rotated, and when the shaft 27 is rotated, the flexible element 36 will be reeled onto the shaft, thus putting the retractile spring 38 under tension. When pressure is removed from the finger piece 18 of the operating member 17, the spring 38 will react, causing a reverse rotation of the shaft 27, the flexible elements 30 rotating the holders 21 to their original positions, and the operating member 17 being slid endwise until the finger piece 18 of the operating member abuts against the platform 10 at one end of the slot 19, as shown in Fig. 2.

It is not mandatory that the egg holders 21 be rotated by the specific mechanism hereinbefore described. Any suitable means for rotating the holders 21 may be provided.

Having thus described the invention, what is claimed is:—

1. An egg tester comprising an egg-holder having an egg seat at its upper end; and means for mounting the holder for rotation about a fixed vertical axis substantially coincident with the geometrical center of the seat.

2. An egg tester comprising an egg-holder having an egg-seat at its upper end; means for mounting the holder for rotation about a fixed vertical axis substantially coincident with the geometrical center of the seat; and means for rotating the holder about said axis.

3. An egg tester comprising an egg-holder having an egg seat at its upper end; means for mounting the holder for rotation about a fixed vertical axis substantially coincident with the geometrical center of the seat; means under the control of an operator for rotating the egg-holder in one direction about said axis; and yieldable means for rotating the egg-holder in an opposite direction about said axis.

4. An egg tester comprising a supporting structure; a plurality of egg-holders each having a seat at its upper end, the egg-holders being journaled in the supporting structure for rotation on fixed vertical axes substantially coincident with the geometrical centers of the respective seats; means for connecting the holders with each other for simultaneous rotation about said axes; and means for rotating the holders about said axes.

5. An egg-tester comprising a supporting structure; a plurality of egg-holders journaled in the supporting structure for rotation about fixed vertical axes; the holders being provided with egg-seats in their upper ends, and the axes of rotation of the holders being substantially coincident with the geometrical centers of the seats; means for connecting the holders with each other for simultaneous rotation about said axes; means under the control of an operator for rotating the egg-holders in one direction about said axes; and yieldable means for rotating the egg-holders in an opposite direction about said axes.

6. An egg-tester comprising a supporting structure; an egg-holder having an egg-seat at its upper end, the egg-holder being mounted in the supporting structure for rotation about a fixed vertical axis substantially coincident with the geometrical center of the seat; a flexible element wound around the egg-holder; means under the control of an operator for imparting tension to the flexible element in one direction; and means for imparting tension to the flexible element in an opposite direction.

7. An egg tester comprising a supporting structure; an egg carrier journaled for rotation in the supporting structure; a shaft journaled on the supporting structure; a flexible element wound around the egg carrier; means connected with one end of the flexible element and under the control of an operator, for actuating the flexible element, the other end of the flexible element being secured to the shaft; a spring; means for attaching one end of the spring to the supporting structure; and a flexible element connected with the other end of the spring and wound about the shaft.

8. An egg tester comprising a lid having an opening; a guide coöperating with the lid; an operating member slidable in the guide and provided with a finger piece projecting through the opening; a sheave journaled on the lid, the guide being provided with an opening located adjacent the sheave; a shaft journaled on the lid; an egg carrier mounted to rotate in the lid; a flexible element connected at one end with the shaft, and trained across the sheave, the other end of the flexible element being connected with the operating member, and the intermediate portion of the flexible element being engaged around the carrier; a retractile spring; means for securing one end of the retractile spring to the lid; and a flexible element engaged around the shaft, the last specified flexible element being connected with the other end of the spring.

In testimony that I claim the foregoing as my own, I have hereto affixed my signature in the presence of two witnesses.

CHARLES P. WOODALL.

Witnesses:
H. A. ELLIOTT,
P. D. PARR.

Copies of this patent may be obtained for five cents each, by addressing the "Commissioner of Patents, Washington, D. C."